(No Model.)
J. H. CROZIER.
HOT AIR EVAPORATOR OR DRIER.
No. 473,452. Patented Apr. 26, 1892.
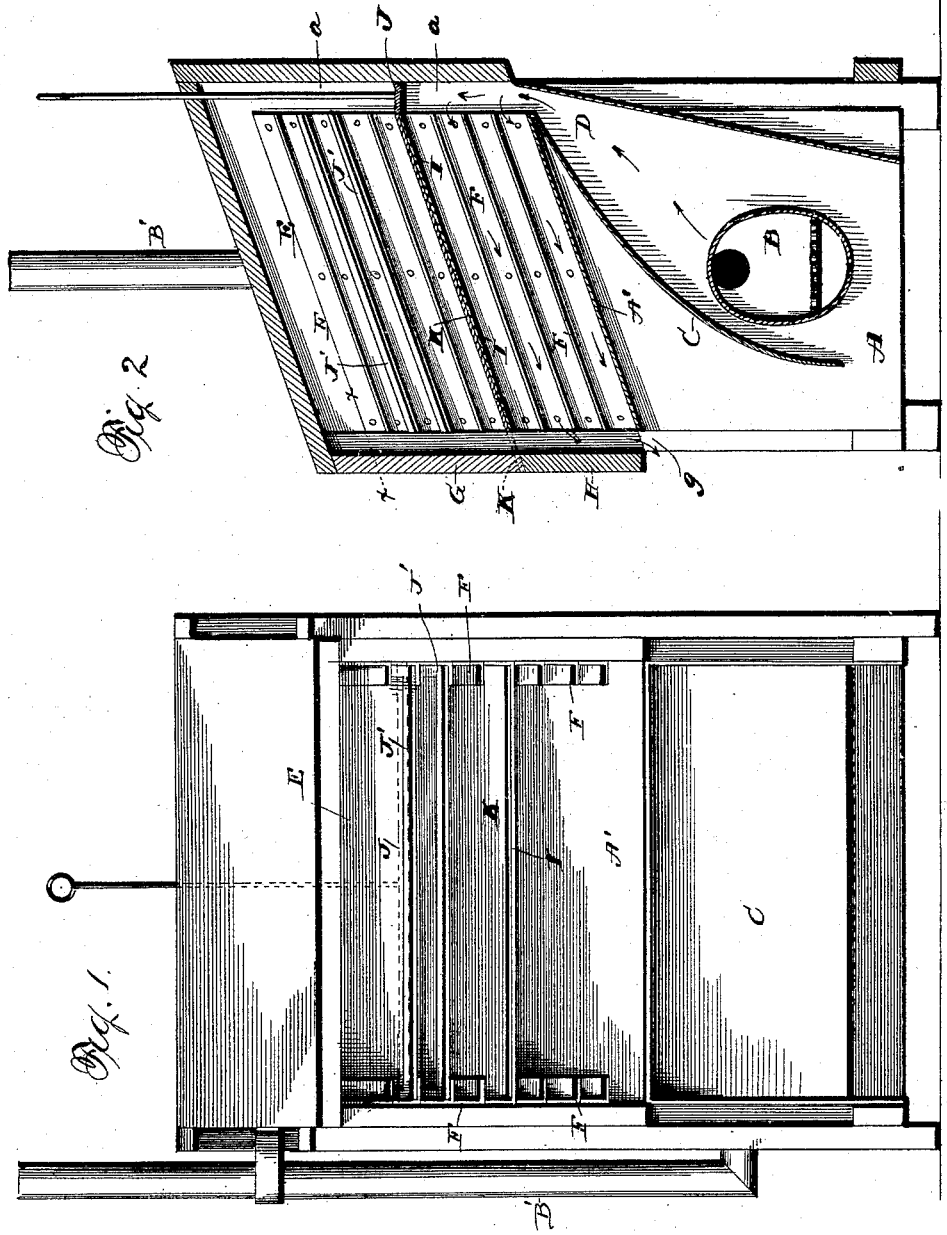
Witnesses
C. J. Williamson.
A. L. Hough
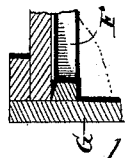
Inventor
John H. Crozier
by Franklin H. Hough
his attorney

UNITED STATES PATENT OFFICE.

JOHN HERVEY CROZIER, OF BEAN'S STATION, TENNESSEE.

HOT-AIR EVAPORATOR OR DRIER.

SPECIFICATION forming part of Letters Patent No. 473,452, dated April 26, 1892.

Application filed March 25, 1891. Serial No. 386,354. (No model.)

*To all whom it may concern:*

Be it known that I, JOHN HERVEY CROZIER, a citizen of the United States, residing at Bean's Station, in the county of Grainger and State of Tennessee, have invented certain new and useful Improvements in Hot-Air Evaporators or Driers; and I do declare the following to be a full, clear, and exact description of the invention, such as will enable others skilled in the art to which it appertains to make and use the same, reference being had to the accompanying drawings, and to the letters of reference marked thereon, which form a part of this specification.
This invention relates to certain new and useful improvements in drying apparatus for use in drying or evaporating fruit, tobacco, lumber, bricks, or other articles or materials, and, while it will be described in this specification as applied for drying fruit in trays, it will of course be understood that I do not intend to restrict myself to such use, as it is evident that the same principle and the same mechanism may be successfully employed for other purposes.

The present invention has for its objects, among others, to provide a simple, cheap, and efficient apparatus in which the fruit or other material or articles may be successfully dried with the minimum of attention on the part of the attendant and at a minimum cost. I provide a chamber above the heating means, and in this chamber the tray-supports are provided. The air enters the drying-chamber at the rear end above the rear ends of the trays, the trays being arranged at an incline, with their rear ends highest. The space between the rear ends of the trays and the back wall of the drying-chamber is practically a continuation of the air-flue from the heater. In the drying-chamber I arrange one or more partitions. The heated air enters each compartment or above each tray at a point higher than the fruit or other material to be dried and passes forward and downward to the front end of the chamber, where it leaves the chamber. The drying-chamber is designed to be air-tight except at the inlet and exit for the air. It is well known that the hottest and driest air is the lightest and has the greatest drying or evaporating capacity, and by my arrangement it is at all times prevented from escaping, but comes in contact with the fruit when lightest and driest and is cooled and moistened as it passes downward over the fruit, taking the moisture therefrom, its weight being materially increased, and it then finds a ready exit at the lower end of the tray. I thus utilize the greatest heat to extract the moisture from the fruit and discharge the air when it has passed its usefulness. I provide ample means for closing the air-inlet when necessary. I provide means for preventing the escape of the heated air when the dried fruit is taken from the chamber and also for preventing the moisture-laden air from falling upon the partially-dried fruit.

Other objects and advantages of the invention will hereinafter appear, and the novel features thereof will be specifically defined by the appended claims.

The novelty in the present instance resides in the peculiar combinations and the construction, arrangement, and adaptation of parts whereby the above ends are accomplished, all as more fully hereinafter described, shown in the drawings, and then particularly pointed out in the claims.

The invention is clearly illustrated in the accompanying drawings, which, with the letters of reference marked thereon, form a part of this specification, and in which—

Figure 1 is a front view of my improved apparatus with the doors thrown open. Fig. 2 is a vertical central section through the same from front to rear. Fig. 3 is a detail section on line *x x* of Fig. 2.

Like letters of reference indicate like parts in all the views where they occur.

Referring now to the details of the drawings by letter, A designates the heating-chamber, in which is located a heater B, which may be of any desired character, B' designating the smoke-stack thereof, extending to above the top of the apparatus, as shown.

C is a shield above the heater and arranged to conduct all of the heat to the rear of the apparatus and forming a flue D, leading into the drying-chamber E, which is located above the heating-chamber and separated therefrom by the floor or bottom A', as shown. The said flue extends to the rear of this floor or bottom, as shown, so that all the heat is delivered above the same.

Within the drying-chamber are arranged a plurality of tray-supports F, which are preferably formed of L-shaped material, secured to the end walls, and arranged on an incline from the rear toward the front, as shown.

At the front end of the drying-chamber and at right angles with the course of the current are arranged the two hinged doors G and H, one above the other, and arranged to be opened and shut independently of each other. These doors are arranged to prevent endwise movement of the trays on their supports.

The drying-chamber is divided into a plurality of compartments by the partition or partitions I, which do not extend quite to the rear wall of the chamber, but leave a space $a$ between the same and the rear wall, as shown, and this space or opening is designed to be closed by a vertically-movable damper J, which is arranged to slide in suitable guides and provided with a handle, by which it is manipulated. The top edge of the lower door is on a line with the middle partition of the drying-chamber, and the doors are provided with battens fastened just far enough from the ends so that they will fit neatly and with some pressure against the inside edges of the drying-chamber, and in order to aid them in starting in the battens should be slightly beveled.

In practice the fruit or other material is placed upon the trays J, which may be of any known or preferred form of construction, and the trays placed in the drying-chamber upon the supports provided therefor. The heated air enters through the flue at the rear of the chamber over the upper ends of the trays and thence passes downward over the fruit and out at the space $g$ at the front of the chamber and out of the apparatus. The arrows denote the course of the air. When the fruit has been sufficiently dried and it is desired, say, to remove the fruit from the upper compartment, it will be necessary to remove the upper door of the drying-chamber. The said door being removed, the air which is the hottest and driest would escape rapidly from the drying-chamber if provision were not made to prevent it. For this purpose I provide a movable plate K, which is arranged to be moved in and out on one set of the tray-supports, and when the upper door is removed this movable plate is moved forward, with its front edge extended out of the drying-chamber and resting upon the upper edge of the lower door, as shown by dotted lines in Fig. 2, and at the same time the damper is moved down to the middle partition, and by this means all of the air is turned into the lower compartment. When this movable slide-plate is drawn forward after fresh fruit has been placed in the trays above the said plate prevents the moisture-laden air as it passes down over the fresh fruit from falling upon the partially-dried fruit in the trays below.

Various modifications in detail may be resorted to without departing from the spirit of the invention or sacrificing any of its advantages.

What I claim as new is—

1. In a drying apparatus, the combination, with the drying-chamber having a flue for the heated air at the rear thereof and the shield C, of a plate K in the chamber extending to the flue and a vertically-movable damper in the flue for closing the space at the end of the said plate, as set forth.

2. In a drying apparatus, the combination, with the drying-chamber having a flue for heated air at the rear thereof, of the inclined tray-supports, the division-partition, the movable damper for the rear flue, and the movable plate K, supported upon one set of the tray-supports, all substantially as shown and described, and for the purpose specified.

3. In a drying apparatus, the combination, with the drying-chamber having a flue at the rear thereof, of the upper and lower doors at the front of the drying-chamber, the movable plate K at the junction of the two doors, the movable damper for the rear flue, and the inclined tray-supports, on one of which said plate is supported, substantially as specified.

4. The drying apparatus described, consisting of the heating-chamber, the drying-chamber with the rear flue, the inclined tray-supports, the two independent upper and lower doors at the front of the drying-chamber, the central inclined partition, the vertically-movable damper for the rear flue, and the movable plate K, all arranged and operating substantially as shown and described.

In testimony whereof I affix my signature in presence of two witnesses.

JOHN HERVEY CROZIER.

Witnesses:
JAMES P. GODWIN,
JOHN D. HARRELL.